US012796665B2

(12) United States Patent
Yagi

(10) Patent No.: US 12,796,665 B2
(45) **Date of Patent: *Nov. 17, 2026**

(54) LURE FOR FISHING

(71) Applicant: GLOBERIDE, Inc., Tokyo (JP)

(72) Inventor: Hiroshi Yagi, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/900,216

(22) Filed: Aug. 31, 2022

(65) Prior Publication Data

US 2023/0122035 A1 Apr. 20, 2023

(30) Foreign Application Priority Data

Oct. 19, 2021 (JP) ................................ 2021-171055
Mar. 29, 2022 (JP) ................................ 2022-054004

(51) Int. Cl.
*A01K 85/01* (2006.01)
*A01K 85/00* (2006.01)

(52) U.S. Cl.
CPC .......... *A01K 85/012* (2022.02); *A01K 85/013* (2022.02)

(58) Field of Classification Search
CPC ...... A01K 85/00; A01K 85/01; A01K 85/011; A01K 85/012; A01K 85/013; A01K 85/015
USPC ......................... 43/17.6, 42.32, 42.33, 42.34
See application file for complete search history.

(56) References Cited

U.S. PATENT DOCUMENTS 515,001 A * 2/1894 Lamb ..................... A01K 85/16 43/42.32
1,180,753 A * 4/1916 Zeigler .................. A01K 85/16 43/42.32
2,294,930 A * 9/1942 Palmquist .............. G02B 5/128 106/221
2,547,240 A * 4/1951 Young .................... A01K 85/14 43/42.34

(Continued)

FOREIGN PATENT DOCUMENTS

CN 103561567 A 2/2014
CN 204888406 U * 12/2015

(Continued)

OTHER PUBLICATIONS

Extended European Search Report for related European Application No. 22192178.6; action dated Mar. 31, 2023; (10 pages).

(Continued)

*Primary Examiner* — Darren W Ark
(74) *Attorney, Agent, or Firm* — Oliff PLC

(57) ABSTRACT

A lure for fishing according to an embodiment of the present disclosure includes a main body portion that includes a cavity inside the main body portion, a portion or the entirety of the cavity being visible from outside, one or more reflecting surfaces or one or more reflectors that can specularly reflect light from the outside are provided on each of at least any two of an outer face of the main body portion, an inner face of the main body portion, and an inside of the cavity, and the light from the outside is specularly reflected once or plural times on each of at least any two of the outer face of the main body portion, the inner face of the main body portion, and the inside of the cavity.

24 Claims, 11 Drawing Sheets

(56) References Cited

U.S. PATENT DOCUMENTS

| | | | | | |
|---|---|---|---|---|---|
| 2,599,035 | A * | 6/1952 | Wing | A01K 85/16 | 43/42.33 |
| 2,670,559 | A * | 3/1954 | Webb | A01K 85/16 | 40/538 |
| 2,733,535 | A * | 2/1956 | Rosen | A01K 85/16 | 43/42.34 |
| 2,736,125 | A * | 2/1956 | Perkins | A01K 85/14 | 43/42.34 |
| 2,909,863 | A * | 10/1959 | Rector | A01K 85/01 | 43/42.49 |
| 3,031,792 | A * | 5/1962 | Swenson | A01K 85/16 | 43/42.2 |
| 3,069,801 | A * | 12/1962 | Mills | A01K 85/16 | 43/42.39 |
| 3,122,853 | A * | 3/1964 | Koonz | A01K 85/14 | 428/30 |
| 3,360,882 | A * | 1/1968 | Belokin, Jr. | A01K 85/16 | D22/126 |
| 3,494,065 | A * | 2/1970 | Benttinen | A01K 85/16 | 359/515 |
| 3,528,189 | A * | 9/1970 | Lilley, Jr. | A01K 85/16 | D22/133 |
| 3,540,144 | A * | 11/1970 | Gurka | A01K 85/16 | 43/42.34 |
| 3,952,445 | A * | 4/1976 | Liebert | A01K 85/00 | 43/42.34 |
| 4,176,490 | A * | 12/1979 | Philips | A01K 85/18 | 43/42.35 |
| 4,631,854 | A * | 12/1986 | Rosko | A01K 85/00 | 43/42.34 |
| 4,637,159 | A * | 1/1987 | Kulis | B29D 11/02 | 623/4.1 |
| 4,700,504 | A * | 10/1987 | Mattison | A01K 85/16 | 43/42.47 |
| 4,757,631 | A * | 7/1988 | Anson-Smith | A01K 97/00 | 43/17.5 |
| 4,803,793 | A * | 2/1989 | Schellenberg, III | A01K 85/16 | 43/42.31 |
| 4,862,631 | A * | 9/1989 | Wilson | A01K 85/16 | 43/42.33 |
| 5,481,821 | A * | 1/1996 | Stanley | A01K 85/14 | 43/42.13 |
| 5,758,450 | A * | 6/1998 | Young | A01K 85/01 | 43/17.6 |
| 5,896,227 | A * | 4/1999 | Toriumi | B29C 70/74 | 359/536 |
| 6,018,901 | A * | 2/2000 | DuBois | A01K 85/00 | 43/42.32 |
| 6,018,902 | A * | 2/2000 | Gudermuth | A01K 85/01 | 428/689 |
| 6,202,337 | B1 * | 3/2001 | Yoshida | A01K 85/16 | 43/42.31 |
| 6,301,823 | B1 * | 10/2001 | Monticello | A01K 85/14 | 43/42.24 |
| 8,402,688 | B2 * | 3/2013 | Choi | A01K 85/01 | 43/42.34 |
| 8,931,205 | B2 * | 1/2015 | Choi | A01K 85/16 | 43/42.34 |
| 11,439,133 | B2 * | 9/2022 | Nakamichi | A01K 85/16 | |
| 11,641,849 | B2 * | 5/2023 | Moe | A01K 85/16 | 43/42 |
| 11,716,979 | B2 * | 8/2023 | Yagi | A01K 85/01 | 43/42 |
| 2003/0019146 | A1 * | 1/2003 | McNally | A01K 85/00 | 43/42.13 |
| 2004/0111950 | A1 * | 6/2004 | Lindgren | A01K 85/01 | 43/17.5 |
| 2008/0060252 | A1 * | 3/2008 | Doss | A01K 95/00 | 43/44.87 |
| 2009/0000177 | A1 * | 1/2009 | Johnson | A01M 31/06 | 43/42.32 |
| 2010/0205849 | A1 * | 8/2010 | Choi | A01K 85/01 | 43/42.35 |
| 2014/0068997 | A1 * | 3/2014 | Choi | A01K 85/16 | 43/42.33 |
| 2016/0309687 | A1 * | 10/2016 | Ito | A01K 85/00 | |
| 2019/0320634 | A1 * | 10/2019 | Kawasaki | A01K 85/16 | |
| 2020/0375164 | A1 * | 12/2020 | Moe | A01K 85/01 | |
| 2021/0274762 | A1 * | 9/2021 | Yagi | A01K 85/12 | |
| 2021/0274763 | A1 | 9/2021 | Yagi | | |
| 2023/0031006 | A1 * | 2/2023 | Yagi | A01K 85/012 | |
| 2023/0065290 | A1 * | 3/2023 | Yagi | A01K 85/013 | |
| 2023/0122035 | A1 * | 4/2023 | Yagi | A01K 85/013 | 43/42.33 |
| 2023/0165230 | A1 * | 6/2023 | Nakamichi | A01K 85/01 | 43/26.2 |
| 2023/0270091 | A1 * | 8/2023 | Yagi | A01K 85/1847 | |
| 2025/0295097 | A1 * | 9/2025 | Yagi | A01K 85/011 | |

FOREIGN PATENT DOCUMENTS

| | | | | | |
|---|---|---|---|---|---|
| CN | 204888409 | U | * | 12/2015 | |
| CN | 106689076 | A | * | 5/2017 | |
| CN | 206507086 | U | * | 9/2017 | |
| CN | 206808476 | U | * | 12/2017 | |
| CN | 206949302 | U | * | 2/2018 | |
| CN | 209563371 | U | * | 11/2019 | A01K 85/00 |
| CN | 212697282 | U | * | 3/2021 | |
| CN | 113349171 | A | | 9/2021 | |
| ES | 2275132 | T3 | * | 6/2007 | A01K 85/16 |
| FR | 2806876 | A1 | * | 10/2001 | A01K 85/16 |
| JP | H02105348 | U | * | 8/1990 | |
| JP | H09154438 | A | * | 6/1997 | |
| JP | H09248100 | A | * | 9/1997 | |
| JP | H09289845 | A | * | 11/1997 | |
| JP | H10127209 | A | * | 5/1998 | |
| JP | H114639 | A | * | 1/1999 | |
| JP | H1175628 | A | | 3/1999 | |
| JP | 2005192471 | A | * | 7/2005 | |
| JP | 2005333890 | A | * | 12/2005 | |
| JP | 3738105 | B2 | | 1/2006 | |
| JP | 2007282843 | A | * | 11/2007 | |
| JP | 2007312765 | A | * | 12/2007 | |
| JP | 2008283876 | A | * | 11/2008 | |
| JP | 2010154762 | A | * | 7/2010 | |
| JP | 2010193836 | A | * | 9/2010 | A01K 85/01 |
| JP | 2011229464 | A | * | 11/2011 | |
| JP | 4918595 | B2 | | 4/2012 | |
| JP | 5613932 | B1 | * | 10/2014 | A01K 91/08 |
| JP | 5709145 | B2 | | 4/2015 | |
| JP | 2017127218 | A | * | 7/2017 | |
| JP | 2020174559 | A | * | 10/2020 | |
| JP | 2021061795 | A | * | 4/2021 | |
| JP | 2021061797 | A | * | 4/2021 | |
| JP | 2021061798 | A | * | 4/2021 | |
| JP | 2021153526 | A | * | 10/2021 | |
| JP | 2023016548 | A | * | 2/2023 | A01K 85/015 |
| KR | 100396225 | B1 | * | 9/2003 | F21V 7/04 |
| WO | WO-9704649 | A1 | * | 2/1997 | A01K 85/16 |
| WO | WO-9819524 | A1 | * | 5/1998 | A01K 85/16 |
| WO | WO-2007037861 | A2 | * | 4/2001 | A01K 85/00 |
| WO | WO-2009040910 | A1 | * | 4/2009 | A01K 85/01 |
| WO | WO-2012153385 | A1 | * | 11/2012 | A01K 85/00 |

OTHER PUBLICATIONS

May 11, 2023 Office Action Issued in Taiwanese Patent Application No. 111131793.

May 24, 2024 Office Action issued in Chinese Application No. 202211019052.4.

May 21, 2024 Official Notification in Japanese Application No. 2022-054004.

Apr. 22, 2024 Third Party Submission in Japanese Application No. 2022-054004.

Jan. 14, 2025 Office Action issued in Taiwanese Application No. 113121080.

Dec. 9, 2025 Office Action issued in Japanese Patent Application No. 2022-054004.

(56) References Cited

OTHER PUBLICATIONS

Aug. 27, 2025 Rejection Decision issued in Taiwanese Patent Application No. 113121080.
http://www.techno-synergy.co.jp/opt_lectures/about_SColor01.html, (Oct. 29, 2025).
Jun. 17, 2026 Office Action issued in Japanese Patent Application No. 2022-054004.

* cited by examiner

LURE FOR FISHING

CROSS-REFERENCE TO RELATED APPLICATIONS

This application claims priority under 35 U.S.C. § 119 to Japanese Patent Application No. 2022-54004 filed on Mar. 29, 2022, which claims priority of Japanese Patent Application No. 2021-171055 filed on Oct. 19, 2021, in the Japanese Patent Office, the entire contents of which are hereby incorporated herein by reference.

FIELD

The present disclosure relates to a lure for fishing.

BACKGROUND

Conventionally, in lure fishing, artificial bait (a lure) obtained by imitating bait such as a small fish is used in order to catch fish eaters. As such a lure, various types of lures, such as bait logs, spoons, plugs, spinners, jigs, or plastic lures, are known.

As one example of such a lure, JP H11-75628 A discloses a fish attracting tool, such as artificial bait, that is used in fishing, and in particular, a fish attracting tool in which an object that reflects rays of light is sealed together with liquid in a body, and complicated reflected light is generated according to a movement of a reflector so that a catch can be increased.

In addition, JP H09-154438 A discloses a color-developing lure that has been obtained by sticking a pair of halved lure members including a transparent or translucent material at the spacing that makes an interior hollow, and in which the halved lure member includes an irregular reflection layer including a large number of recesses and protrusions on an inner face, a reflection film has been formed on a surface of the irregular reflection layer, and an outer face is a smooth layer.

SUMMARY

However, in the fish attracting tool, as disclosed in JP H11-75628 A, light can be reflected, but reflected light is weak, or in the first place, the reflected light does not reach fish eaters depending on an angle of light from the outside that is applied to a small piece. This has caused a problem in which a fish attracting effect is not necessarily enhanced. In addition, the color-developing lure, as disclosed in JP H09-154438 A, only causes irregular reflection, and fails to form strong reflected light due to diffused reflected light. As a result, the color-developing lure is hard to be noticed by fish eaters, and this has caused a problem in which the fish attracting effect is not necessarily enhanced. On the other hand, it is known that fish such as sardines camouflage themselves by performing reflection that is close to specular reflection in order to not be discovered from the sky by birds or the like, and strong reflected light in this reflection that is close to specular reflection attracts fish eaters depending on a direction in which the strong reflected light is reflected. However, both the fish attracting tool disclosed in JP H11-75628 A and the lure disclosed in JP H09-154438 A have failed to achieve the above.

It is an object of an embodiment of the present disclosure to provide a lure that is capable of more reliably and intensely attracting fish eaters, by reducing attenuation in reflection of external light in a plurality of places of the lure to enable reflection to be performed at a higher light luminance, and enable reflected light to be formed in various directions. Other objects of the embodiment of the present disclosure will become apparent by referring to the entirety hereof.

A lure for fishing according to an embodiment of the present disclosure is a lure for fishing that includes a main body portion that includes a cavity inside the main body portion, in which a portion or an entirety of the cavity is visible from outside, and one or more reflecting surfaces or one or more reflectors that specularly reflect light from the outside are provided on each of at least any two of an outer face of the main body portion, an inner face of the main body portion, and an inside of the cavity, and the light from the outside is specularly reflected once or plural times on each of at least any two of the outer face of the main body portion, the inner face of the main body portion, and the inside of the cavity.

In the lure for fishing according to the embodiment of the present disclosure, the one or more reflecting surfaces or the one or more reflectors that specularly reflect the light from the outside are provided on each of the outer face of the main body portion, the inner face of the main body portion, and the inside of the cavity, and the light from the outside is specularly reflected once or plural times on each of the outer face of the main body portion, the inner face of the main body portion, and the inside of the cavity.

In the lure for fishing according to the embodiment of the present disclosure, each of the plurality of reflecting surfaces is formed in a circular shape, a polygonal shape, an arc shape, or a scaly shape. In addition, in the lure for fishing according to the embodiment of the present disclosure, at least some of the one or more reflectors are formed in a cylindrical shape, a wave shape, a polygonal shape, a polyhedral shape, a spherical shape, or a tile shape.

In the lure for fishing according to the embodiment of the present disclosure, in a case where the one or more reflecting surfaces or the one or more reflectors are provided on the inside of the cavity, the one or more reflecting surfaces or the one or more reflectors are directly or indirectly supported by a portion of the main body portion. In addition, in the lure for fishing according to the embodiment of the present disclosure, one or more of the plurality of reflecting surfaces or the plurality of reflectors are formed integrally with the main body portion.

In the lure for fishing according to the embodiment of the present disclosure, the main body portion is formed to diffuse and transmit the light from the outside. In the lure for fishing according to the embodiment of the present disclosure, the light from the outside or reflected light to the outside develops color at a time of transmission through the main body portion.

In the lure for fishing according to the embodiment of the present disclosure, in a case where the one or more reflecting surfaces or the one or more reflectors are provided on the inner face of the main body portion, the one or more reflecting surfaces or the one or more reflectors are formed by using vapor deposition coating, a holographic film, a hologram sheet, metal adhesion, resin adhesion, or glass-sheet adhesion.

In the lure for fishing according to the embodiment of the present disclosure, the main body portion is formed by using resin or metal.

In the lure for fishing according to the embodiment of the present disclosure, in a case where the one or more reflecting surfaces or the one or more reflectors are provided, each of the one or more reflecting surfaces or the one or more reflectors has an identical shape or a different shape.

According to various embodiments of the present disclosure, a lure can be provided that is capable of more reliably and intensely attracting fish eaters, by reducing attenuation in reflection of external light in a plurality of places of the lure to enable reflection to be performed at a higher light luminance, and enable reflected light to be formed in various directions.

DETAILED DESCRIPTION

Figure 1A:
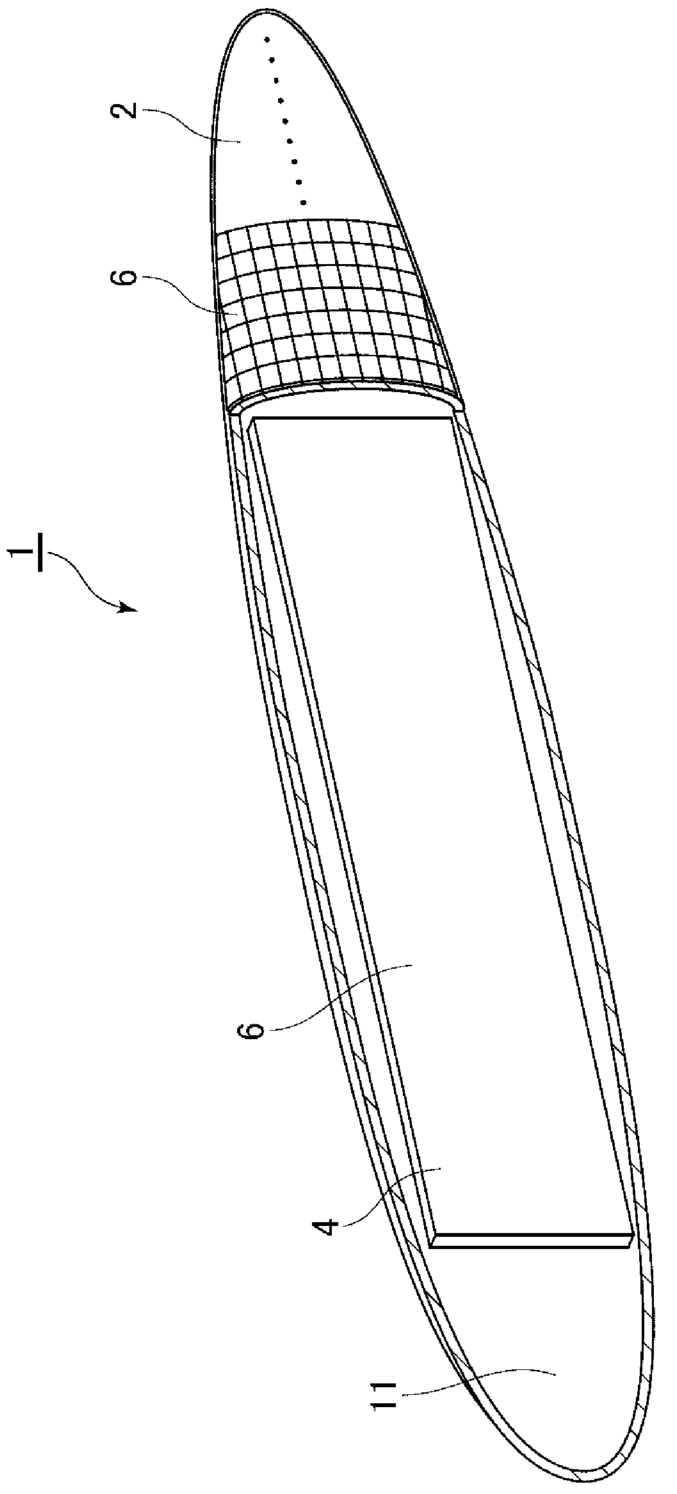
FIG. 1A is a perspective view of a lure for fishing according to an embodiment of the present disclosure.

Various embodiments of the present disclosure are described below with appropriate reference to the drawings. Note that a common component in the drawings is denoted by the same reference sign.

Figure 1B:
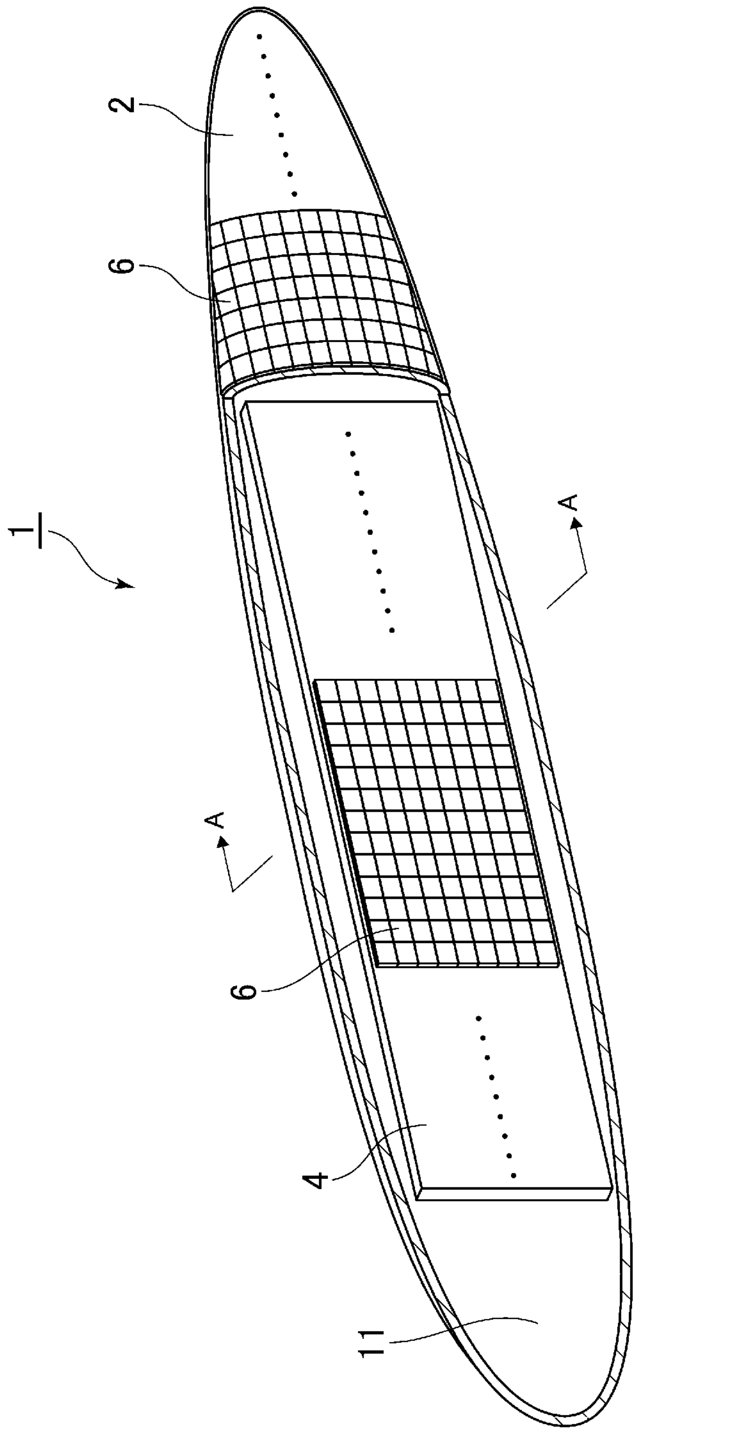
FIG. 1B is a perspective view of the lure for fishing according to the embodiment of the present disclosure.
Figure 2:
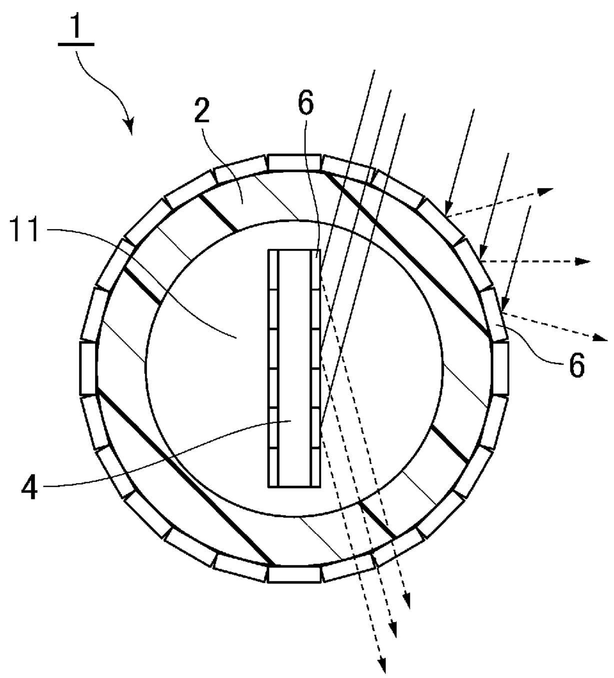
FIG. 2 is a sectional view of the lure for fishing according to the embodiment of the present disclosure.
Figure 3:
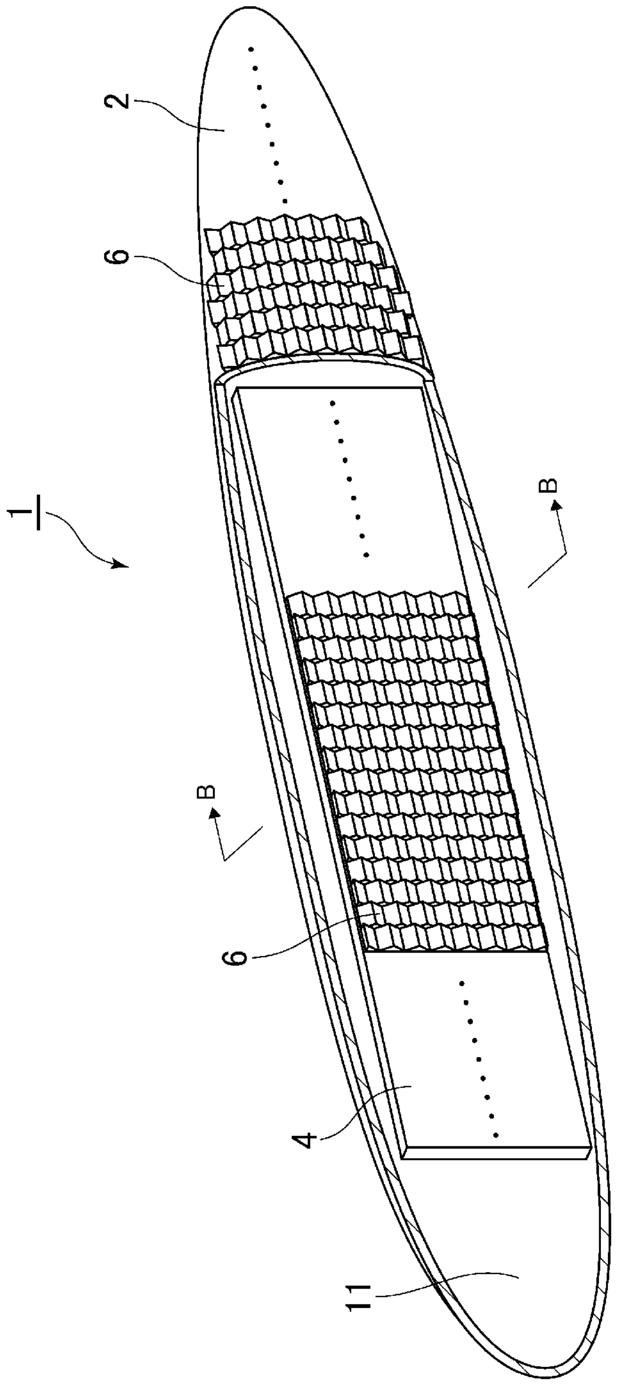
FIG. 3 is a perspective view of the lure for fishing according to the embodiment of the present disclosure.
Figure 4:
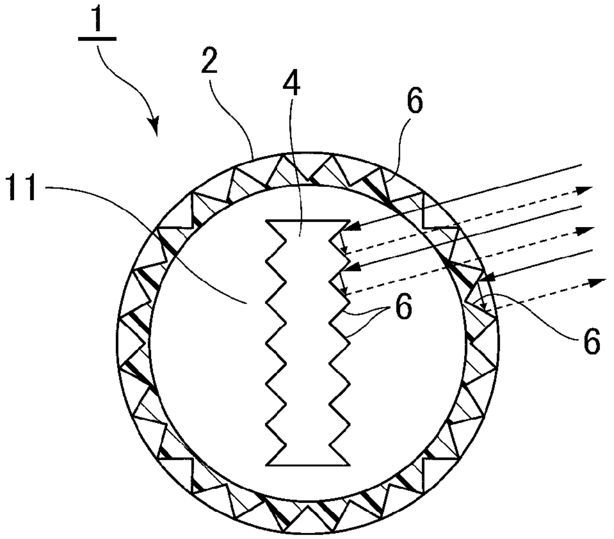
FIG. 4 is a sectional view of the lure for fishing according to the embodiment of the present disclosure.

A lure 1 for fishing according to an embodiment of the present disclosure is described with reference to FIGS. 1A and 1B to FIG. 4 (FIGS. 1A and 1B and FIG. 3 illustrate perspective views, and FIGS. 2 and 4 illustrate sectional views in cross section A-A and cross section B-B of FIGS. 1B and 3). The lure 1 for fishing according to the embodiment of the present disclosure includes a main body portion (main body) 2 that includes a cavity (a cavity part) 11 inside the main body portion 2. A portion or the entirety of the cavity 11 is visible from outside (or can be visually recognized from outside). One or more reflecting members (reflecting members) 4 (one or more reflecting surfaces (reflecting surfaces) or reflectors) that can specularly reflect light from the outside are provided on each of at least any two of an outer face of the main body portion 2, an inner face of the main body portion 2, and an inside of the cavity 11. The light from the outside is specularly reflected once or plural times on each of at least the two (at least any two of the outer face of the main body portion 2, the inner face of the main body portion 2, and the inside of the cavity 11).

In the examples illustrated in FIGS. 1A and 1B and FIG. 2, the lure 1 for fishing according to the embodiment of the present disclosure includes the main body portion 2 that includes the cavity 11 inside the main body portion 2. A portion or the entirety of the cavity 11 is visible from outside. One reflecting member 4 (FIG. 1A illustrates a case where one reflecting surface 6 is included, and FIG. 1B and FIG. 2 that is a sectional view of FIG. 1B illustrate a case where a plurality of reflecting surfaces 6 is included) that can specularly reflect light from the outside is provided on the inside of the cavity 11, and a plurality of reflecting surfaces 6 that can specularly reflect the light from the outside is provided on the outer face of the main body portion 2. The light from the outside is specularly reflected once in each of two places (the inside of the cavity 11 and the outer face of the main body portion 2). As described above, specular reflection is performed in a plurality of places of the lure, and therefore a broader range of incident light can be caught and reflected, and reflected light can be more reliably transmitted in a desired direction.

Note that in a case where the reflecting member 4 (for example, the plurality of reflecting surfaces 6) is provided, the reflecting member 4 (the plurality of reflecting surfaces 6) and the main body portion 2 may be integrally or separately provided (the similar is applied to the entirety hereof). Even in a case where the reflecting member 4 (the plurality of reflecting surfaces 6) and the main body portion 2 are separately provided, a portion or the entirety of the reflecting member 4 (some or all of the plurality of reflecting surfaces 6) may be provided to be in contact with the main body portion 2 (the similar is applied to the entirety hereof). Here, the reflecting member 4 performs specular reflection, and therefore a reflecting surface of the reflecting member 4 has been formed on a plane that satisfies the law of reflection (in reflection, an angle of incidence and an angle of reflection are equal to each other, and have signs reverse to each other) (hereinafter, the similar is applied). In addition, the reflecting member 4 includes the reflecting surface 6 or the reflector 7, but other aspects are also conceivable (hereinafter, the similar is applied).

Here, specular reflection is defined as "reflection that satisfies the law of reflection (in reflection, an angle of incidence and an angle of reflection are equal to each other, and have signs reverse to each other)", and the luminance of reflected light is higher than luminance in normal diffuse reflection. Therefore, it is known that specular reflection of external light enables the strength of reflected light to be significantly increased, and as a result, the reflected light can be transmitted far away (hereinafter, the similar is applied). Here, the reflection luminances of specular reflection and diffuse reflection change according to various conditions, but under the same conditions, the luminance of diffuse reflection is about ⅓ or less the luminance of specular reflection. In the present disclosure, it is to be noted that "specular reflection" does not only include ideal specular reflection, but also includes reflection having a luminance that is 40% or more of the luminance of ideal specular reflection (herein referred to as quasi specular reflection).

In addition, external light is made incident from various directions, and a principal conceivable example of the external light is sunlight that arrives underwater from above the surface of the water. Such external light (incident light) is made incident in an upward/downward (vertical) direction or in an oblique direction from above the surface of the water toward a lure in the water. The lure attracts fish eaters, and therefore it is desirable that specular reflection be performed in a roughly leftward/rightward (lateral) direction or an oblique lateral direction of the lure. In this point, the lure has been designed to perform a predetermined movement in practical fishing. In a case where a reflecting member that causes specular reflection is disposed, the reflecting member can be disposed in an appropriate position in advance consideration of an expected movement of the lure (also referred to as a lure action), but this does not intend limitations to a specified direction or orientation. Note that it can be said that if a large number of reflecting surfaces are provided in order to cause specular reflection in a multi-direction, an efficiency of reflecting incident light within an appropriate range (in an appropriate direction) increases. However, it is to be noted that if the lure action is rolling, even a single reflecting member can effectively reflect light within an appropriate range (in an appropriate direction).

Next, in the examples illustrated in FIGS. 3 and 4, the lure 1 for fishing according to the embodiment of the present disclosure includes the main body portion 2 that includes the cavity 11 inside the main body portion 2. A portion or the entirety of the cavity 11 is visible from outside. One reflecting member 4 (the plurality of reflecting surfaces 6) that can specularly reflect light from the outside is provided on the inside of the cavity 11, and the plurality of reflecting surfaces 6 that can specularly reflect the light from the outside is provided on the outer face of the main body portion 2. The light from the outside is specularly reflected two times in each of two places (the inside of the cavity 11 and the outer face of the main body portion 2). As described above, specular reflection is performed plural times in each of a plurality of places of the lure, and therefore a broader range of incident light can be caught and reflected, and reflected light can be more reliably transmitted in a desired direction.

According to the lure 1 for fishing according to the embodiment of the present disclosure, a lure can be provided that is capable of more reliably and intensely attracting fish eaters, by reducing attenuation in reflection of external light in a plurality of places of the lure to enable reflected light to be formed at a higher light luminance in various directions. Here, as described above, specular reflection is defined as "reflection that satisfies the law of reflection (in reflection, an angle of incidence and an angle of reflection are equal to each other, and have signs reverse to each other)", and the luminance of reflected light is higher than luminance in normal diffuse reflection. Therefore, it is known that specular reflection of external light enables the strength of reflected light to be significantly increased, and as a result, the reflected light can be transmitted far away (hereinafter, the similar is applied). The reflection luminances of specular reflection and diffuse reflection change according to various conditions, but under the same conditions, the luminance of diffuse reflection is about ⅕ or less the luminance of specular reflection. As described above, in the present disclosure, it is to be noted that "specular reflection" does not only include ideal specular reflection, but also includes reflection having a luminance that is 40% or more of the luminance of ideal specular reflection (herein referred to as quasi specular reflection).

Figure 5:
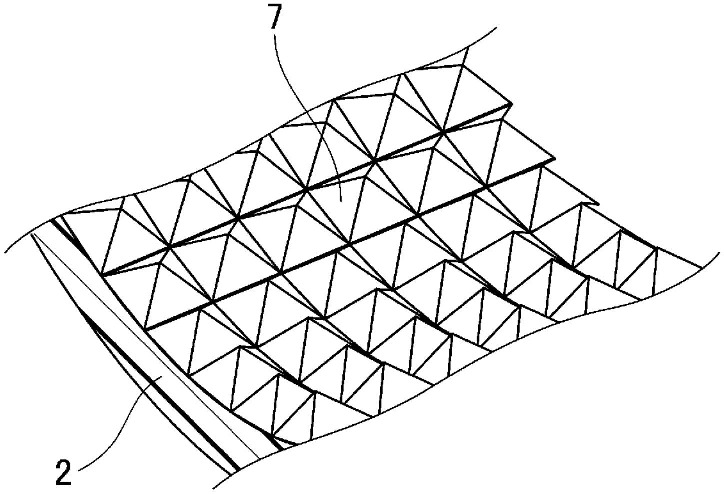
FIG. 5 is a diagram explaining a reflector of the lure for fishing according to the embodiment of the present disclosure.

Next, an example of a reflector of the lure 1 for fishing according to the embodiment of the present disclosure is described with reference to FIG. 5. FIG. 5 illustrates some of a plurality of reflectors in the lure 1. In the lure 1 for fishing according to the embodiment of the present disclosure, one or more reflecting members 4 (in the illustrated example, pyramid prisms serving as a plurality of reflectors 7) that can specularly reflect light from the outside are provided on the inner face of the main body portion 2. The light from the outside is specularly reflected plural times (at least two times or more) (in the illustrated example, specular reflection is performed two times). As described above, the plurality of reflecting members 4 performs specular reflection plural times, and therefore a broader range of incident light can be caught and reflected, and reflected light can be more reliably transmitted in a desired direction. According to the lure 1 for fishing according to the embodiment of the present disclosure, a lure can be provided that includes an attraction part that is capable of more reliably and intensely attracting fish eaters, by reducing attenuation in reflection of external light to enable reflection to be performed at a higher light luminance plural times, and enable reflected light to be formed in various directions.

In addition, the plurality of reflecting members 4 (the plurality of reflecting surfaces 6 or reflectors 7) that can specularly reflect light from the outside may be provided on the outer face of the main body portion 2 and the inner face of the main body portion 2, on the outer face of the main body portion 2 and the inside of the cavity 11, or on the inner face of the main body portion 2 and the inside of the cavity 11. In addition, the one or more reflecting members 4 (the one or more reflecting surfaces 6 or reflectors 7) that can specularly reflect light from the outside may be provided on the outer face of the main body portion 2, the inner face of the main body portion 2, and the inside of the cavity 11.

Figure 6A:
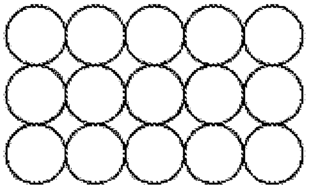
FIGS. 6A to 6G are diagrams explaining a reflecting surface of the lure for fishing according to the embodiment of the present disclosure.
Figure 6B:
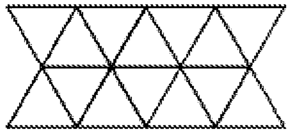
Figure 6C:
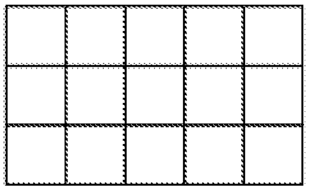
Figure 6D:
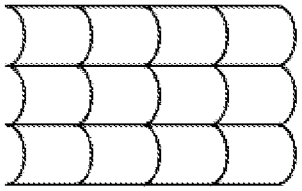
Figure 6E:
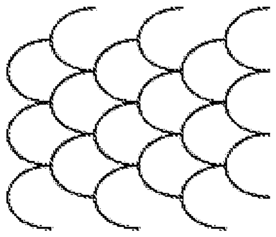
Figure 6F:
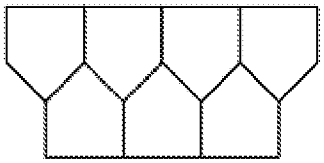
Figure 6G:
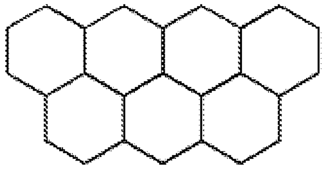
Figure 7:
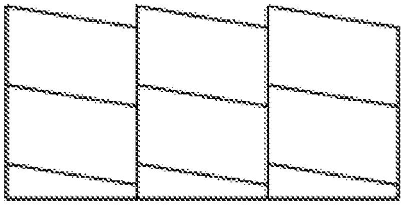
FIG. 7 is a diagram explaining the reflecting surface of the lure for fishing according to the embodiment of the present disclosure.
Figure 8A:
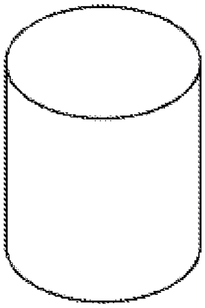
FIGS. 8A to 8E are diagrams explaining the reflector of the lure for fishing according to the embodiment of the present disclosure.
Figure 8B:
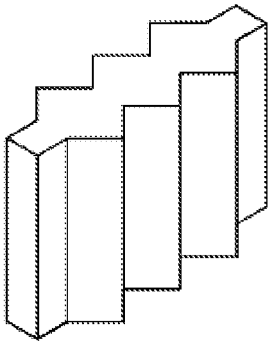
Figure 8C:
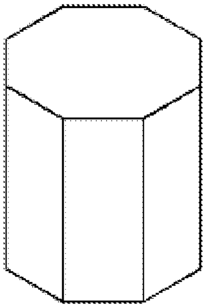
Figure 8D:
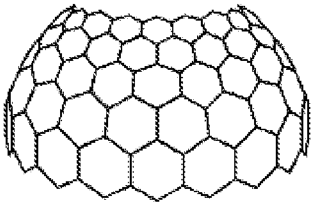
Figure 8E:
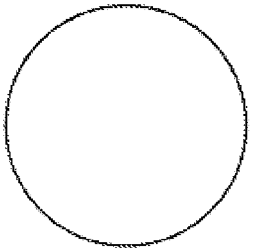
Figure 9:
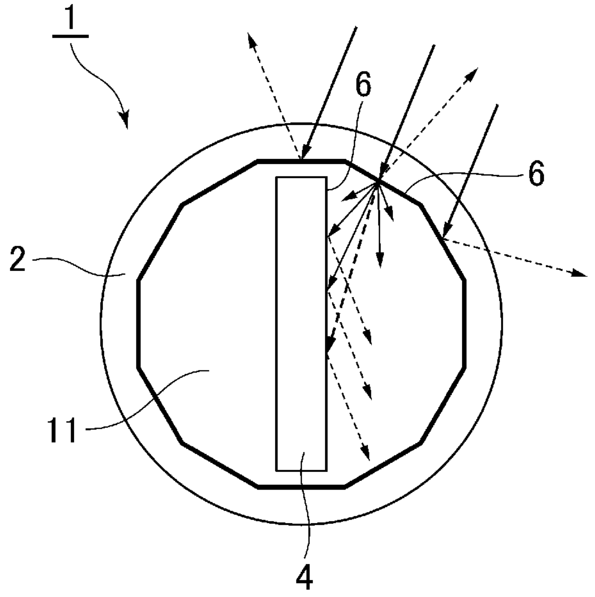
FIG. 9 is a sectional view of a lure for fishing according to an embodiment of the present disclosure.

Next, as illustrated in FIGS. 6A to 6G and FIG. 7, in the lure 1 for fishing according to the embodiment of the present disclosure, the reflecting surface 6 is formed in a circular shape, a polygonal shape including a triangular shape, a quadrangular shape, a pentagonal shape, a hexagonal shape, and the like (in the cases of FIGS. 6A, 6B, 6C, 6F, and 6G), an arc shape, or a scaly shape (a shape imitating fish scales) (in the cases of FIGS. 6D and 6E). In addition, in a case where the plurality of reflecting surfaces 6 is provided, each of the reflecting surfaces may be disposed on the same plane, or may be disposed on a curved surface along a shape of the main body portion 2 (hereinafter, the similar is applied). Further, each of the reflecting surfaces may be disposed to be inclined by the same predetermined angle (in the case of FIG. 7) or by a different angle (hereinafter, the similar is applied). Furthermore, in the lure for fishing according to the embodiment of the present disclosure, the reflecting surfaces are formed in a plurality of curved surface shapes or spherical shapes. This enables specular reflection to be performed plural times (two times or more). By doing this, a large number of reflecting surfaces that perform specular reflection are provided to emit realistic specular reflection light, as bait fish does, and therefore effective appealing can be performed.

Next, as illustrated in FIGS. 8A to 8E, in the lure 1 for fishing according to the embodiment of the present disclosure, at least some of the reflectors 7 are formed into cylinders (in the case of FIG. 8A), wave shapes (in the case of FIG. 8B), polygons such as polygonal prisms or polygonal pyramids (in the case of FIG. 8C), polyhedrons (in the case of FIG. 8D), spheres (in the case of FIG. 8E), tile shapes (saw-tooth shapes), or a tile-shaped laminate. The use of these enables specular reflection to be performed once or plural times. By doing this, incident light from more directions can be specularly reflected, and realistic reflected light is emitted, as bait fish do. This enables effective appealing.

In the lure 1 for fishing according to the embodiment of the present disclosure, in a case where one or more reflecting surfaces 6 or reflectors 7 are provided on the inside of the cavity 11, the one or more reflecting surfaces 6 or reflectors 7 are directly or indirectly supported by a portion of the main body portion 2. In addition, in the lure 1 for fishing according to the embodiment of the present disclosure, the main body portion 2 is formed in such a way that light from the outside can be diffused and transmitted. By doing this, specular reflection can be performed plural times in a plurality of places of the lure. In addition, in the lure for fishing according to the embodiment of the present disclosure, the light from the outside or reflected light to the outside develops color at a time of transmission through the main body portion. In this case, in order to cause transmitted light to develop color, the main body portion is formed by using transparent ABS resin or acrylic resin that has been colored in a color to be developed within a range in which light can be transmitted, but this is not restrictive. As described above, in a case where it is desired that colored reflected light be generated, transmitted light that is transmitted through the main body portion can be utilized.

In the lure 1 for fishing according to the embodiment of the present disclosure, in a case where one or more reflecting surfaces 6 or reflectors 7 are provided on the inner face of the main body portion 2, in the one or more reflecting surfaces 6 or reflectors 7, a specular surface is formed by using, for example, vapor deposition coating, a holographic film, a hologram sheet, metal adhesion, resin adhesion, or glass-sheet adhesion, but these are not restrictive. By doing this, reflection efficiency is improved, for example, in use in a portion, such as the abdomen (a lower face) of the lure, that light from above the surface of the water easily enters, and stronger reflected light can be emitted, or weak incident light can also be reliably reflected.

In the lure 1 for fishing according to the embodiment of the present disclosure, the main body portion 2 is formed by using resin (for example, ABS, acryl, or the like) or metal (for example, zinc, lead, tungsten, or the like). In addition, a portion of the main body portion 2 may be formed by using at least any of resin (for example, ABS, acryl, or the like) and metal (for example, zinc, lead, tungsten, or the like). Further, in the lure 1 for fishing according to the embodiment of the present disclosure, in a case where a plurality of reflecting surfaces 6 or reflectors 7 is provided, the respective reflecting surfaces 6 or reflectors 7 may have the same shape or shapes different from each other.

In addition, the reflecting member 4 that is provided on the outer face or inner face of the main body portion 2 may be disposed to have a clearance. Therefore, external light may enter an inside of the main body portion 2 from the clearance, and the external light that has entered as described above may be reflected to another reflecting member 4 that is disposed in the main body portion 2. By doing this, the plurality of swinging portions of the reflecting member 4 can reflect light received from the outside, in various directions. Therefore, reflected light reliably reaches fish eaters. This enables an attracting effect to be significantly enhanced.

In addition, a lure for fishing according to another embodiment of the present disclosure is formed by using resin (for example, ABS, acryl, or the like) or metal (for example, zinc, lead, tungsten, or the like). A plurality of reflecting surfaces or reflectors that can specularly reflect light from the outside is provided on an outer face of the lure, and the light from the outside is specularly reflected once or plural times. Further, the lure for fishing according to the other embodiment of the present disclosure may be formed by using a material that is different from the resin or metal described above. Furthermore, the lure for fishing according to the other embodiment of the present disclosure is a jig, a Tenya, or a spoon.

Herein, it is to be noted that the lure includes the jig, the Tenya, and the spoon. If a reflecting surface or a reflector that specularly reflects light that enters an outer face from many directions is appropriately provided on the outer face, as described above, reflected light reliably reaches fish eaters even by using the jig, the Tenya, or the spoon. Therefore, an attracting effect can be significantly enhanced. In addition, the lure for fishing according to the other embodiment of the present disclosure may be formed to be solid. In this case, the lure is formed to not include a cavity part inside. Alternatively, the lure for fishing according to the other embodiment of the present disclosure may be provided with a cavity part in at least a portion of the lure.

Next, a lure 1 for fishing according to another embodiment of the present disclosure is described with reference to FIGS. 9 to 15 (the drawings illustrate sectionals views of the lure 1 for fishing according to the other embodiment of the present disclosure in positions that correspond to positions of cross section A-A and cross section B-B in FIGS. 1B and 3). First, in the example illustrated in FIG. 9, a lure 1 for fishing according to an embodiment of the present disclosure includes a main body portion 2 that includes a cavity 11 inside the main body portion 2. A portion or the entirety of the cavity 11 is visible from outside. One reflecting member 4 (a reflecting surface 6) that can specularly reflect light from the outside is provided on an inside of the cavity 11, and a plurality of reflecting surfaces 6 that specularly reflects the light from the outside is provided on an inner face of the main body portion 2. The light from the outside is specularly reflected once in each of the two places (the inside of the cavity 11 and the inner face of the main body portion 2).

As described above, specular reflection is performed in a plurality of places of the lure, and therefore a broader range of incident light can be caught and reflected, and reflected light can be more reliably transmitted in a desired direction. Here, in a process in which light from the outside is specularly reflected by the reflecting member 4 (the reflecting surface 6) that is provided on the inside of the cavity 11, a portion of the light from the outside is transmitted through the main body portion 2. Diffuse transmission is performed when the light from the outside reaches the inside of the cavity 11, and therefore light that enters the inside of the cavity 11 is diffused in various directions. A large portion of such incident light is specularly reflected by the reflecting member 4 (the reflecting surface 6) in the cavity 11, and therefore attenuation in reflection of relatively weak incident light is also reduced to enable reflection to be reliably performed at a high light luminance, and enable reflected light to be reflected in a broader range of direction (in the case of specular reflection in the reflecting member 4 (the reflecting surface 6) in the cavity 11 in FIG. 9).

Figure 10:
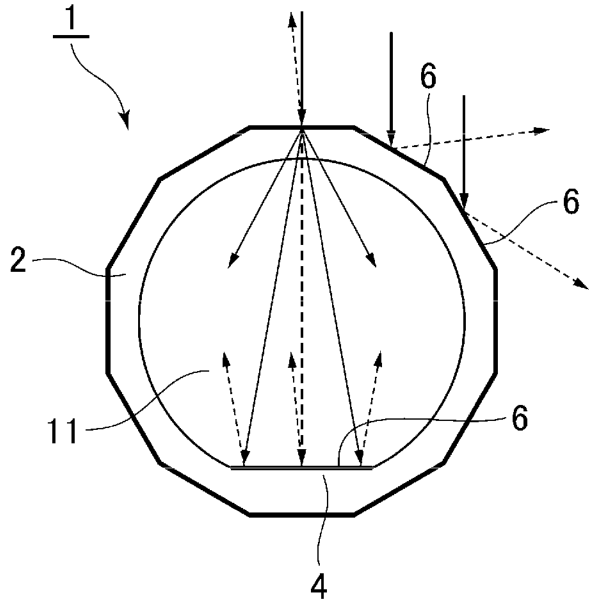
FIG. 10 is a sectional view of a lure for fishing according to an embodiment of the present disclosure.

Next, in the example illustrated in FIG. 10, a lure 1 for fishing according to an embodiment of the present disclosure includes a main body portion 2 that includes a cavity 11 inside the main body portion 2. A portion or the entirety of the cavity 11 is visible from outside. One reflecting member 4 (a reflecting surface 6) that can specularly reflect light from the outside is provided integrally with the main body portion 2 on an inside of the cavity 11, and a plurality of reflecting surfaces 6 that can specularly reflect the light from the outside is provided on an outer face of the main body portion 2. The light from the outside is specularly reflected once in each of the two places (the inside of the cavity 11 and the outer face of the main body portion 2).

As described above, specular reflection is performed in a plurality of places of the lure, and therefore a broader range of incident light can be caught and reflected, and reflected light can be more reliably transmitted in a desired direction. Here, in a process in which light from the outside is specularly reflected by the reflecting member 4 (the reflecting surface 6) that is provided integrally with the main body portion 2 on the inside of the cavity 11, a portion of the light from the outside is transmitted through the main body portion 2. Diffuse transmission is performed when the light from the outside reaches the inside of the cavity 11, and therefore light that enters the inside of the cavity 11 is diffused in various directions. A large portion of such incident light is specularly reflected by the reflecting member 4 (the reflecting surface 6) in the cavity 11, and therefore attenuation in reflection of relatively weak incident light is also reduced to enable reflection to be reliably performed at a high light luminance, and enable reflected light to be reflected in a broader range of direction (in the case of specular reflection in the reflecting member 4 (the reflecting surface 6) that is provided integrally with the main body portion 2 in the cavity 11 in FIG. 10).

Figure 11:
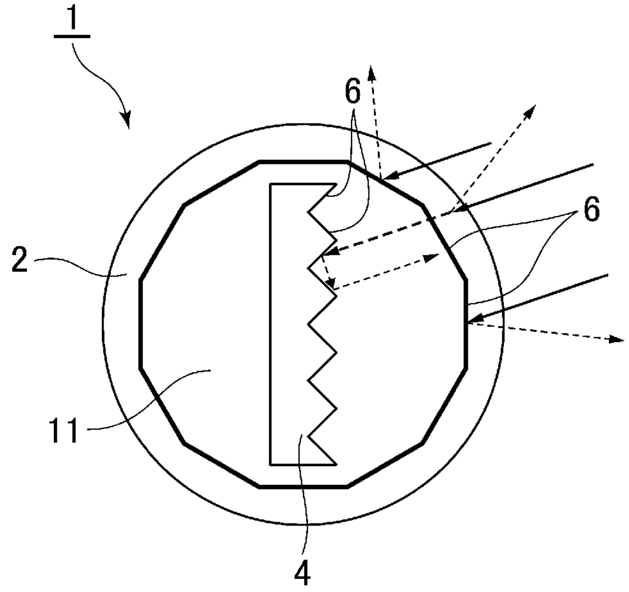
FIG. 11 is a sectional view of a lure for fishing according to an embodiment of the present disclosure.

Next, in the example illustrated in FIG. 11, a lure 1 for fishing according to an embodiment of the present disclosure includes a main body portion 2 that includes a cavity 11 inside the main body portion 2. A portion or the entirety of the cavity 11 is visible from outside. One reflecting member 4 (a reflecting surface 6) that can specularly reflect light from the outside is provided on an inside of the cavity 11, and a plurality of reflecting surfaces 6 that can specularly reflect the light from the outside is provided on an inner face of the main body portion 2. The light from the outside is specularly reflected two times and once in two places (the inside of the cavity 11 and the inner face of the main body portion 2), respectively. As described above, specular reflection is performed in a plurality of places of the lure, and therefore a broader range of incident light can be caught and reflected, and reflected light can be more reliably transmitted in a desired direction.

Figure 12:
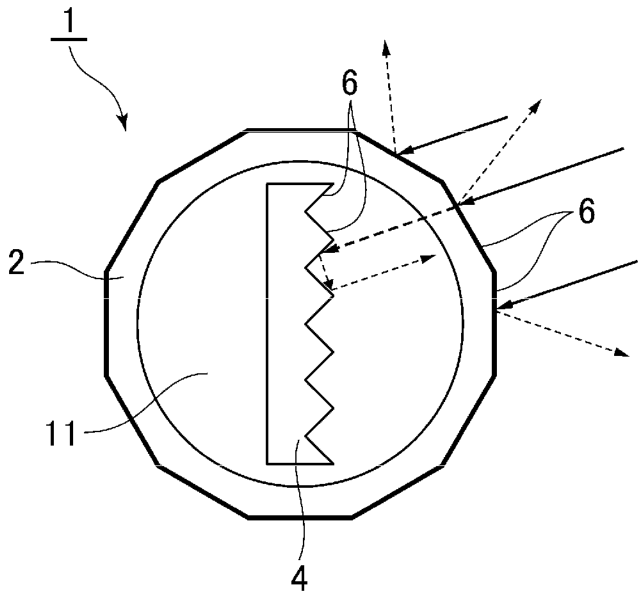
FIG. 12 is a sectional view of a lure for fishing according to an embodiment of the present disclosure.

In addition, in the example illustrated in FIG. 12, a lure 1 for fishing according to an embodiment of the present disclosure includes a main body portion 2 that includes a cavity 11 inside the main body portion 2. A portion or the entirety of the cavity 11 is visible from outside. One reflecting member 4 (a reflecting surface 6) that can specularly reflect light from the outside is provided on an inside of the cavity 11, and a plurality of reflecting surfaces 6 that can specularly reflect the light from the outside is provided on an outer face of the main body portion 2. The light from the outside is specularly reflected two times and once in two places (the inside of the cavity 11 and the outer face of the main body portion 2), respectively. As described above, specular reflection is performed in a plurality of places of the lure, and therefore a broader range of incident light can be caught and reflected, and reflected light can be more reliably transmitted in a desired direction.

Figure 13:
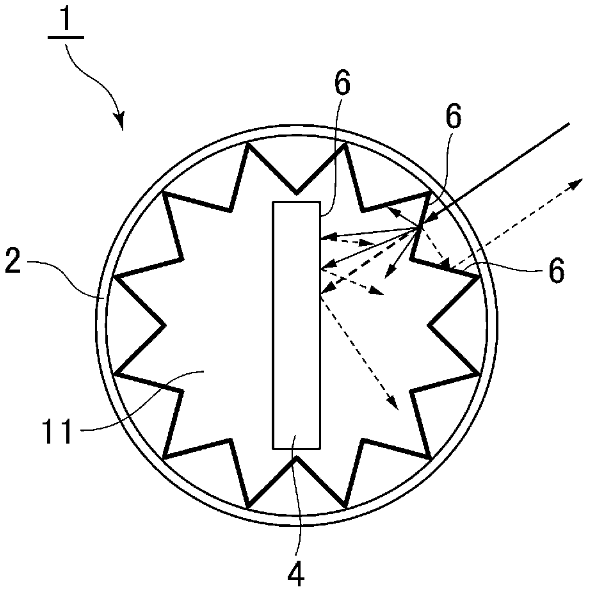
FIG. 13 is a sectional view of a lure for fishing according to an embodiment of the present disclosure.

Next, in the example illustrated in FIG. 13, a lure 1 for fishing according to an embodiment of the present disclosure includes a main body portion 2 that includes a cavity 11 inside the main body portion 2. A portion or the entirety of the cavity 11 is visible from outside. One reflecting member 4 (a reflecting surface 6) that can specularly reflect light from the outside is provided on an inside of the cavity 11, and a plurality of reflecting surfaces 6 that can specularly reflect the light from the outside is provided on an inner face of the main body portion 2. The light from the outside is specularly reflected once and two times in two places (the inside of the cavity 11 and the inner face of the main body portion 2), respectively.

As described above, specular reflection is performed in a plurality of places of the lure, and therefore a broader range of incident light can be caught and reflected, and reflected light can be more reliably transmitted in a desired direction. Here, in a process in which light from the outside is specularly reflected by the reflecting member 4 (the reflecting surface 6) that is provided on the inside of the cavity 11, a portion of the light from the outside is transmitted through the main body portion 2. Diffuse transmission is performed when the light from the outside reaches the inside of the cavity 11, and therefore light that enters the cavity 11 is diffused in various directions. A large portion of such incident light is specularly reflected by the reflecting member 4 (the reflecting surface 6) in the cavity 11, and therefore attenuation in reflection of relatively weak incident light is also reduced to enable reflection to be reliably performed at a high light luminance, and enable reflected light to be reflected in a broader range of direction (in the case of specular reflection in the reflecting member 4 (the reflecting surface 6 in the cavity 11 in FIG. 13). In addition, in a process in which such transmitted light enters an inside of an object to be transmitted through or reflected light is emitted to the outside, colored light, as described later, can be formed. Light reflected as described above serves as color-developing reflected light, causes a reduction in attenuation in reflection, and can be reliably reflected at a high light luminance.

Figure 14:
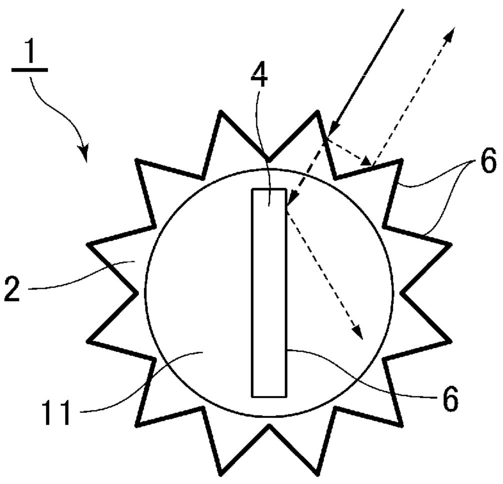
FIG. 14 is a sectional view of a lure for fishing according to an embodiment of the present disclosure.

In addition, in the example illustrated in FIG. 14, a lure 1 for fishing according to an embodiment of the present disclosure includes a main body portion 2 that includes a cavity 11 inside the main body portion 2. A portion or the entirety of the cavity 11 is visible from outside. One reflecting member 4 (a reflecting surface 6) that can specularly reflect light from the outside is provided on an inside of the cavity 11, and a plurality of reflecting surfaces 6 that can specularly reflect the light from the outside is provided on an outer face of the main body portion 2. The light from the outside is specularly reflected once and two times in two places (the inside of the cavity 11 and the outer face of the main body portion 2), respectively. As described above, specular reflection is performed in a plurality of places of the lure, and therefore a broader range of incident light can be caught and reflected, and reflected light can be more reliably transmitted in a desired direction.

Figure 15:
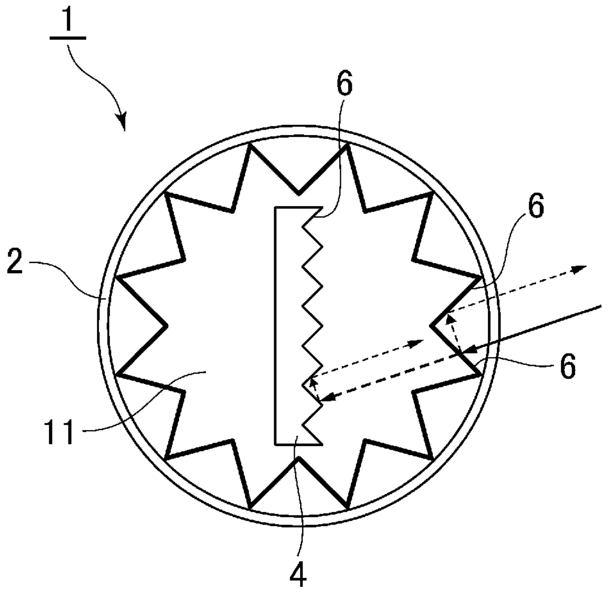
FIG. 15 is a sectional view of a lure for fishing according to an embodiment of the present disclosure.

Next, in the example illustrated in FIG. 15, a lure 1 for fishing according to an embodiment of the present disclosure includes a main body portion 2 that includes a cavity 11 inside the main body portion 2. A portion or the entirety of the cavity 11 is visible from outside. One reflecting member 4 (a reflecting surface 6) that can specularly reflect light from the outside is provided on an inside of the cavity 11, and a plurality of reflecting surfaces 6 that can specularly reflect the light from the outside is provided on an inner face of the main body portion 2. The light from the outside is specularly reflected two times in each of the two places (the inside of the cavity 11 and the inner face of the main body portion 2). As described above, specular reflection is performed in a plurality of places of the lure, and therefore a broader range of incident light can be caught and reflected, and reflected light can be more reliably transmitted in a desired direction.

Next, a method for forming a reflecting surface that performs specular reflection of the one or more reflecting surfaces 6 or reflectors 7 in the lure 1 for fishing according to the embodiment of the present disclosure is described. Conceivable examples of the method for forming the reflecting surface that performs specular reflection include resin injection molding, molding of metal, glass, or the like, additive molding of a very thin coating film, formation of a coating film on a surface of a metal/resin mold, and the like, and another conventionally known technology can also be used. By using the method described above, a specular reflecting surface can be formed directly or indirectly on an inner face or an outer face of a bod of a lure, or a specular reflecting surface member can be formed in a cavity of the lure to adhere to the main body portion.

In addition, whether a reflecting surface to be formed performs specular reflection or diffuse reflection depends on surface roughness, a material, or the like of the reflecting surface to be formed. A specular reflecting surface of the one or more reflecting surfaces 6 or reflectors 7 in the lure 1 for fishing according to the embodiment of the present disclosure can be formed by determining a material and surface roughness that enable reflection having a luminance that is 40% or more of a luminance in ideal specular reflection, and using the forming method described above. For example, in the case of resin injection molding, in particular, the surface roughness of a mold surface gives influence. However, a difference in molding material (for example, ABS that is frequently used for a lure has a great surface roughness in comparison with acryl) also significantly affects formation of a specular surface. Even in such a case, a specular surface is thinly coated with a transparent paint, and therefore an influence of surface roughness can be reduced.

Here, JP H09-154438 A discloses an example of diffuse reflection that serves as a color-developing lure, and the following physical or technical features are provided as a method for causing specular reflection light of a lure to develop color. Reflected light that has been reflected by a certain object absorbs a specified wavelength from the object, and contains a large amount of specified wavelength component, and therefore color is developed. In diffuse reflection light in the case of diffuse reflection, a certain color of a surface of the object is absorbed in the object (referred to as "light absorption"), and irregular reflection is performed, and therefore the color is "developed" in the reflected light. On the other hand, in specular reflection light in the case of specular reflection, regular reflection is reflection of a mirror in which light is emitted in a direction of an angle of reflection that is equal to an angle of incidence, and is different from irregular reflection in which light is also emitted to be diffused in a direction that is different from the angle of reflection. Therefore, it can be said that a certain color of the surface of the object is not basically "developed". In other words, in a case where reflected light appears to be colored in a color of the surface of the object, this indicates that the color has been absorbed in the reflected light and irregular reflection has been performed, and it can be said that specular reflection has not been performed. However, in the case of a lure body that has been formed by coloring transparent resin to be similar to red glass like stained glass, and in the case of transmitted light that is transmitted through this lure body (rather than reflected light that is reflected by this lure body), in incident light from the outside (for example, white incident light) or light reflected to the outside, only red light becomes transmitted light, and as a result, light that is not red is absorbed during transmission through the lure body, as described above. Therefore, it is to be noted that a method for causing specularly reflected light to develop color can be achieved by applying a fact that only red light becomes transmitted light, and as a result, red light (colored light) is formed.

As described above, external light is made incident from various directions, and a principal conceivable example of the external light is sunlight that arrives underwater from above the surface of the water. Such external light (incident light) is made incident in an upward/downward (vertical) direction or in an oblique direction from above the surface of the water toward a lure in the water. In a lure according to the disclosure of the present application, such external light (incident light) is specularly reflected at a luminance of reflected light that is higher than a luminance in normal diffuse reflection (in the case of irregular reflection), for example, in a roughly leftward/rightward (lateral) direction or an oblique lateral direction of the lure. Therefore, the strength of reflected light that is reflected by the lure (an object) can be significantly increased, and this enables reflected light to be transmitted far away. In addition, a color that fish like can be developed by causing the reflected light to be transmitted through a colored translucent resin main body (a body), as needed. It has been discovered that the lure according to the disclosure of the present application can more accurately and reliably attract fish eaters.

Dimensions, a material, and disposition of each component described herein are not limited to dimensions, a material, and disposition that have been explicitly described in the embodiments, and variations can be made to these respective components in such a way that these respective components have arbitrary dimensions, material, and disposition that can be included in the scope of the present disclosure. In addition, a component that has not been explicitly described herein can be added to the described embodiments, or some of the components described in each of the embodiments can be omitted.

What is claimed is:

1. A lure for fishing comprising: a main body portion that includes a cavity inside the main body portion, wherein a portion or an entirety of the cavity is visible from outside, and one or more reflecting surfaces that are planar or one or more reflectors with planar surfaces that are each configured to specularly reflect light from the outside, and are provided on each of at least any two of an outer face of the main body portion, an inner face of the main body portion, and an inside of the cavity, and the lure is configured so that light from the outside is specularly reflected once or plural times on each of the at least any two of the outer face of the main body portion, the inner face of the main body portion, and the inside of the cavity.

2. The lure according to claim 1, wherein the one or more reflecting surfaces or the one or more reflectors that are configured to specularly reflect the light from the outside are provided on each of the outer face of the main body portion, the inner face of the main body portion, and the inside of the cavity, and the lure is configured so that the light from the outside is specularly reflected once or plural times on each of the outer face of the main body portion, the inner face of the main body portion, and the inside of the cavity.

3. The lure according to claim 1, wherein each of the one or more reflecting surfaces or the one or more reflectors has a circular shape, a polygonal shape, an arc shape, or a scaly shape.

4. The lure according to claim 1, wherein at least some of the one or more reflecting surfaces or at least some of the one or more reflectors have a wave shape, a polygonal shape, a polyhedral shape, or a tile shape.

5. The lure according to claim 1, wherein the one or more reflecting surfaces or the one or more reflectors are provided on the inside of the cavity, and the one or more reflecting surfaces or the one or more reflectors are directly or indirectly supported by a portion of the main body portion.

6. The lure according to claim 1, wherein the one or more reflecting surfaces or the one or more reflectors are formed integrally with the main body portion.

7. The lure according to claim 1, wherein the main body portion is configured to diffuse and transmit the light from the outside.

8. The lure according to claim 7, wherein the light from the outside or light reflected to the outside develops color from transmission through the main body portion.

9. The lure according to claim 1, wherein the one or more reflecting surfaces or the one or more reflectors are provided on the inner face of the main body portion, and the one or more reflecting surfaces or the one or more reflectors are formed by using vapor deposition coating, a holographic film, a hologram sheet, metal adhesion, resin adhesion, or glass-sheet adhesion.

10. The lure according to claim 1, wherein the main body portion is made of resin or metal.

11. The lure according to claim 1, wherein the lure has a plurality of the reflecting surfaces or a plurality of the reflectors, and each of the plurality of the reflecting surfaces or each of the plurality of the reflectors has an identical shape.

12. The lure according to claim 1, wherein the lure has a plurality of the reflecting surfaces or a plurality of the reflectors, and the plurality of the reflecting surfaces or the plurality of the reflectors have different shapes.

13. The lure according to claim 1, wherein each of the one or more reflecting surfaces or each of the one or more reflectors are configured to reflect light at a brightness that is 40% or more of the brightness of ideal specular reflection.

14. The lure according to claim 1, wherein the main body portion simulates the shape of a bait fish.

15. The lure according to claim 1, wherein the lure is a stick bait, a spoon, a plug, a spinner or a jig.

16. The lure according to claim 1, wherein the main body portion is formed of a resin, and the lure includes the one or more reflecting surfaces provided at least on the inner face of the main body portion, and the one or more reflecting surfaces are integrally formed with the main body portion.

17. The lure according to claim 16, wherein the resin is ABS resin or acrylic resin.

18. The lure according to claim 16, wherein the inside of the cavity also includes one or more of the reflectors.

19. The lure according to claim 1, wherein the one or more reflectors is a plurality of reflectors, and at least one of the plurality of reflectors has a polyhedral shape with a plurality of the reflecting surfaces.

20. The lure according to claim 19, wherein the polyhedral shape is a pyramid.

21. The lure according to claim 20, wherein each of the reflecting surfaces has a triangular shape.

22. The lure according to claim 19, wherein each of the plurality of reflectors abuts another of the plurality of reflectors.

23. The lure according to claim 22, wherein the plurality of reflectors are arranged in a plurality of rows in which each row abuts an adjacent row.

24. The lure according to claim 19, wherein the plurality of reflectors are provided on the inner face of the main body portion.

* * * * *